United States Patent
Takada

[11] Patent Number: 6,011,256
[45] Date of Patent: Jan. 4, 2000

[54] LIGHT BEAM SCANNING DEVICE AND CONTROL METHOD THEREFOR

[75] Inventor: Norihisa Takada, Kanagawa, Japan

[73] Assignee: Fuji Photo Film Co., Ltd., Kanagawa, Japan

[21] Appl. No.: 08/985,247

[22] Filed: Dec. 4, 1997

[30] Foreign Application Priority Data

Dec. 6, 1996 [JP] Japan .................................. 8-340371

[51] Int. Cl.⁷ ........................................................ G02F 1/29
[52] U.S. Cl. ........................ 250/235; 250/578.1; 359/305; 359/285; 347/233
[58] Field of Search ................................. 250/235, 578.1; 359/305, 285; 372/13; 347/233; 385/7

[56] References Cited

U.S. PATENT DOCUMENTS

| | | | |
|---|---|---|---|
| 3,935,566 | 1/1976 | Snopko | 355/38 |
| 4,000,493 | 12/1976 | Spaulding et al. | 347/255 |
| 4,053,898 | 10/1977 | Hirayama et al. | 347/241 |
| 4,295,145 | 10/1981 | Latta | 347/255 |
| 4,960,320 | 10/1990 | Taniura | 359/285 |
| 5,305,022 | 4/1994 | Ota et al. | 347/233 |
| 5,724,087 | 3/1998 | Sugano et al. | 347/243 |
| 5,825,400 | 10/1998 | Florence | 347/239 |

*Primary Examiner*—Edward P. Westin
*Assistant Examiner*—Thanh X. Luu
*Attorney, Agent, or Firm*—Sughrue, Mion, Zinn, Macpeak & Seas, PLLC

[57] ABSTRACT

There are proposed light beam scanning method and device for scanning with plural light beams split by using a multi-frequency acousto-optic device (AOM). By remarkably increasing the number of light beams, an image is recorded at a higher speed. Plural incident light beams are split in the subsidiary scanning direction by different multi-frequency acousto-optic devices. The split light beams are displaced so as not to overlap one another in the subsidiary scanning direction, while respective sets of light beams split by the acousto-optic devices are deviated in a main scanning direction, for scanning. The deviation in the main scanning direction is compensated with a clock timing of an image signal. The light beams split by the AOMs may be alternately positioned in the subsidiary scanning direction. Alternatively, a set of light beams split by one AOM may be adjacent to a set of light beams split by another AOM in the subsidiary scanning direction.

7 Claims, 2 Drawing Sheets

LIGHT BEAM SCANNING DEVICE AND CONTROL METHOD THEREFOR

BACKGROUND OF THE INVENTION

1. Field of the Invention

The present invention relates to a light beam scanning device which performs scanning with plural light beams split by using a multi-frequency acousto-optic device and a control method therefor.

2. Description of the Related Art

In a light beam scanning device which records an image by scanning with light beams, multi-beam scanning systems are known in which plural light beams are used to increase an image recording speed. In one of the methods, a light beam is split into plural light beams by a multi-frequency acousto-optic device (Acousto-Optic Modulator, hereinafter referred to as AOM).

The multi-frequency AOM is constituted by placing a piezoelectric thin-film transducer to a transparent medium. As a drive signal applied to the transducer, a signal with voltages of plural frequencies superimposed thereto is used. Therefore, when the AOM is driven with the drive signal, an incident light beam is split by a diffraction angle into plural light beams in accordance with the frequencies included in the drive signal.

By using the multi-frequency AOM, the incident light beam is split in a subsidiary scanning direction, and an image is recorded by scanning with the split light beams. The frequencies of the drive signal for the AOM are turned on/off by a binary image signal. Specifically, the light beams split by different frequencies are turned on/off based on an on/off state of the image signals of scanning lines drawn by respective light beams.

However, the multi-frequency AOM heretofore used has following two problems. One problem is that when the superimposed frequencies are close to one another, intervals among the split light beams become excessively small, thereby causing an interference between adjoining light beams. The other problem is that a usable frequency band is limited. For this, the number of split light beams cannot be increased very much, which is an obstruction to the recording of an image at a higher speed in the method.

SUMMARY OF THE INVENTION

The present invention has been accomplished under the circumstances as aforementioned, and an object thereof is to provide a control method of a light beam scanning device in which when a multi-frequency AOM is used, by largely increasing the number of light beams, a speed of recording an image can be increased.

Another object of the invention is to provide a device which is directly used for operating the control method.

To attain these and other objects, the invention provides a control method of a light beam scanning device for scanning with light beams split in a subsidiary scanning direction by using a multi-frequency acousto-optic device. Plural incident light beams are split by different multi-frequency acousto-optic devices in the subsidiary scanning direction, a set of the split light beams are displaced in order not to overlap one another set of the light beams in the subsidiary scanning direction, and respective sets of light beams split by the acousto-optic devices are deviated in a main scanning direction during scanning operation. The deviation in the main scanning direction is compensated with a clock timing of an image signal.

Here, when the light beams split by the AOMs are alternately positioned in the subsidiary scanning direction, intervals among the light beams split by one AOM are enlarged, which is suitable for the prevention of the interference among the split light beams. Also, when a set of light beams split by one AOM is positioned adjacent to a set of light beams split by another AOM in the subsidiary scanning direction, a frequency bandwidth of the AOM does not become excessively large.

The invention also provides a light beam scanning device for scanning with light beams split in a subsidiary scanning direction by using a multi-frequency acousto-optic device. The device is provided with plural multi-frequency acousto-optic devices for splitting plural light beams in a subsidiary scanning direction, an acousto-optic device controller for controlling the acousto-optic devices in such a manner that the sets of the light beams split by the acousto-optic devices do not overlap one another in the subsidiary scanning direction, a scanning optical system for deviating sets of light beams split by the acousto-optic devices in a main scanning direction for scanning, and a clock generator for controlling a clock timing of an image signal to compensate a deviation in the main scanning direction of the sets of light beams.

Here, a light beam position detector may be provided. Based on a detected light beam position, data for compensating deflection angles of the AOMs and data for compensating the clock timing are obtained and stored. In this case, prior to real scanning, a preliminary scanning is performed by driving the AOMs separately to detect the light beam positions of the respective AOMs. By using a detection result, the data can be obtained and stored in a memory.

DETAILED DESCRIPTION OF THE PREFERRED EMBODIMENTS

Figure 1:
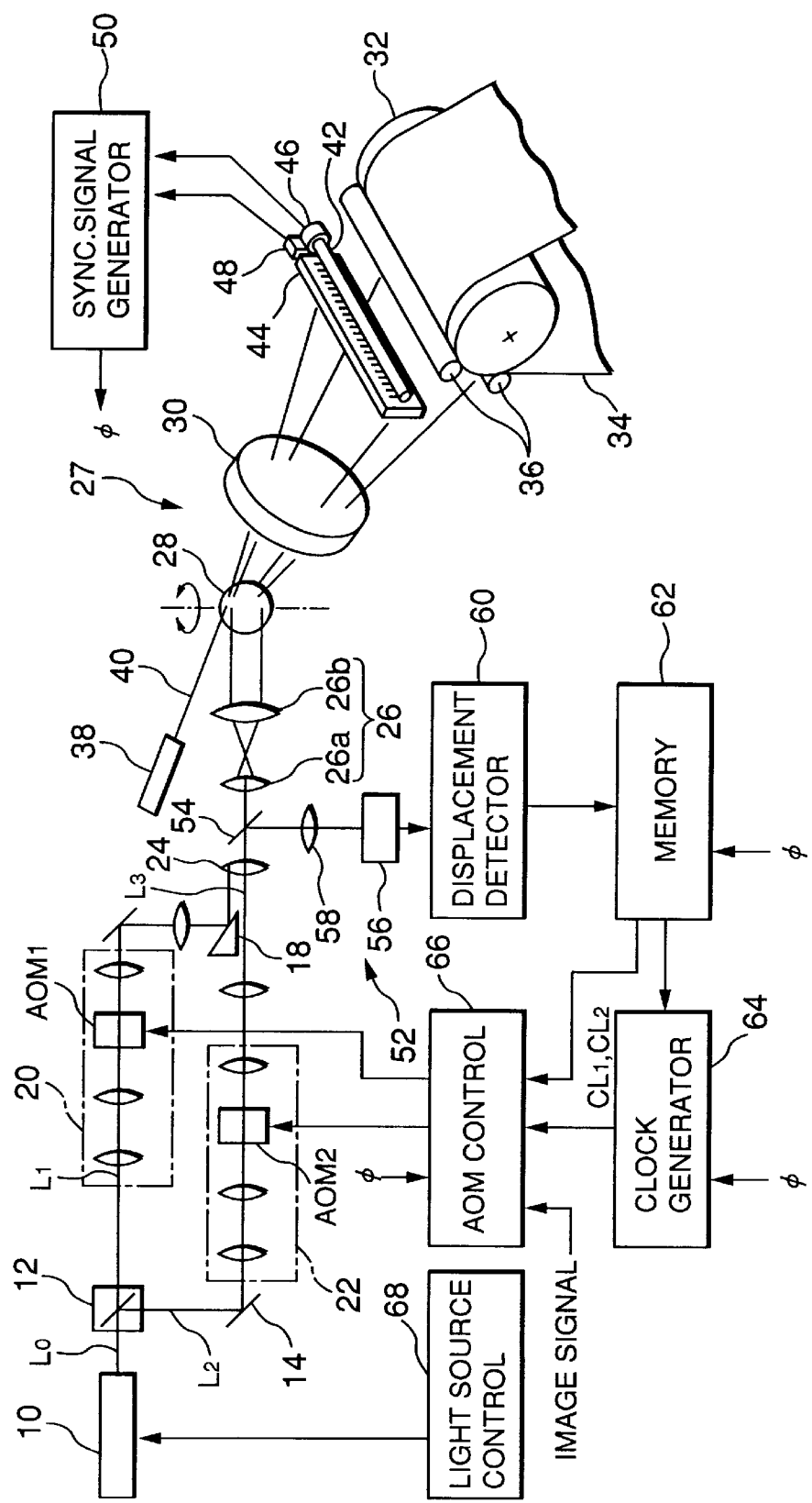
FIG. 1 shows a diagram showing an embodiment of the invention.

In FIG. 1, reference numeral 10 is a laser source such as a He-Ne laser, an Ar laser or the like. A laser beam $L_0$ emitted from the laser source 10 is split into two light beams $L_1$ and $L_2$ by a polarizing beam splitter 12. The light beam $L_1$ is projected via a group of lenses into a multi-frequency AOM1.

The light beam $L_2$ split by the beam splitter 12 is projected via a mirror 14 and a group of lenses into a multi-frequency AOM2. The light beams $L_1$ and $L_2$ are enlarged in the groups of lenses, respectively, and thereafter combined by a mirror 18 to form a composite light beam $L_3$.

Here, the AOM1 and the AOM2 form identical units 20 and 22 together with the groups of lenses arranged before and after the AOMs, respectively. Also, the AOM1 and the AOM2 are both driven with multiple frequencies. Specifically, by applying drive signals of overlapped plural frequencies to the AOMs 1 and 2, the incident light beams $L_1$ and $L_2$ can be split into plural deflected light beams. Positions of the AOMs 1 and 2 in a rotating direction relative to the light beams $L_1$ and $L_2$ are set in such a manner that the light beams $L_1$ and $L_2$ are split in a subsidiary scanning direction on a scanning surface as described later.

The light beam $L_3$ combined by the mirror 18 is led to a recording film 34 wound on a drum 32, through a lens 24, lenses 26a and 26b forming a beam expander 26, a resonant scanner 28 forming a scanning optical system 27 and a scanning lens (fθ lens) 30.

The resonant scanner 28 has a mirror which is rotatable around an axis perpendicular to a scanning plane of the light beam $L_3$. The mirror is oscillated due to resonance of a leaf spring. The scanning lens 30 converges the light beam $L_3$ onto the record film 34. Additionally, nip rollers 36 are provided for maintaining the record film 34 in full contact with the surface of the drum 32.

Numeral 38 denotes a synchronous light source for emitting a laser beam for use as a synchronous light beam 40. The laser beam 40 is guided via the resonant scanner 28 and the scanning lens 30 into a condenser rod 42. The condenser rod 42 is a rod-shaped condenser lens arranged close to and parallel with the drum 32. A synchronous reference plate 44 is provided in front of the condenser rod 42, which has a grid for transmitting the light beam 40 intermittently at constant intervals, and a photosensor 46 is attached to one end of the condenser rod 42.

When the light beam 40 is incident on the condenser rod 42 through the reference plate 44, the photosensor 46 detects the light beam 40 and its scanning position. Since the light beam 40 is scanned by the resonant scanner 28 in the same manner as the recording light beam $L_3$, the scanning position of the recording light beam $L_3$ can be obtained from the scanning position of the light beam 40. Additionally, a line synchronous photosensor 48 is provided for detecting a scanning start timing of the light beam 40.

A synchronous signal generator 50 receives output signals of the photosensors 46 and 48 to generate a synchronous signal φ. The synchronous signal φ indicates the scanning position of the light beam $L_3$ in a main scanning direction, i.e., the position of the light beams deflected by means of the resonant scanner 28.

Between the lens 24 and the beam expander 26 provided is a light beam position detector 52. The light beam position detector 52 has a beam sampler 54 for splitting the light beam $L_3$ behind the lens 24 and a focusing lens 58 for focusing the split light beams on a quarter beam position detecting element 56. An output of the beam position detecting element 56 is transmitted to a displacement detector 60.

The displacement detector 60 obtains a displacement a in a subsidiary scanning direction and a displacement b in a main scanning direction of the light beams $L_1$ and $L_2$ deflected by the AOM1 and the AOM2. The displacements a and b are described basing on FIG. 2.

Figure 2A:
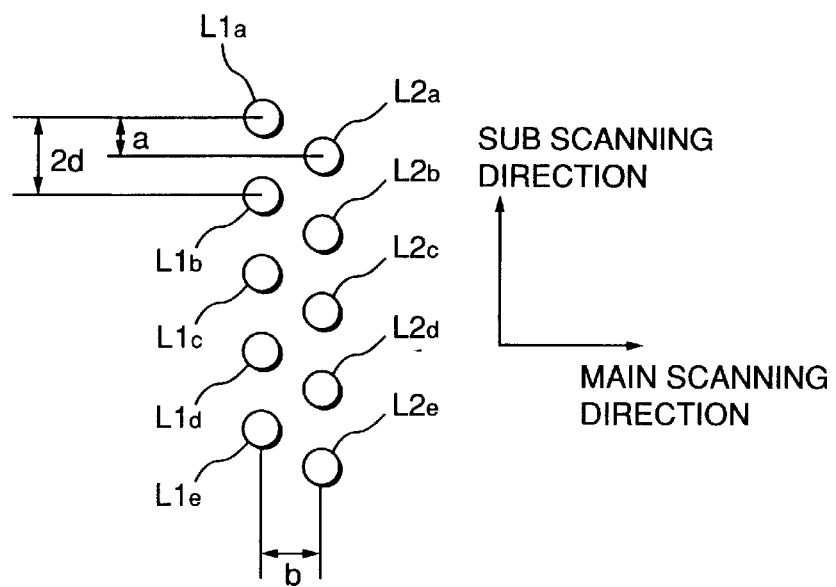
FIGS. 2A and 2B are explanatory views showing arrangements of scanning light beams incident on a scanning surface.
Figure 2B:
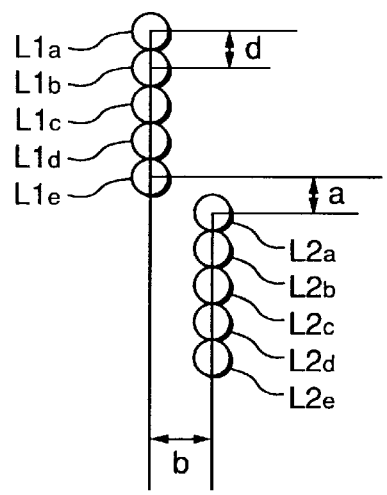

FIGS. 2A and 2B show positions of the light beams $L_1$ and $L_2$ recorded on the scanning plane, i.e., the recording sheet 34. These light beams $L_1$ and $L_2$ are combined into one light beam $L_3$ for scanning. In actual, the light beam $L_3$ is constituted of multiple light beams $L_{1a}$ to $L_{1e}$ and $L_{2a}$ to $L_{2e}$ which are obtained by splitting two light beams $L_1$ and $L_2$ by the AOM1 and the AOM2. In the embodiment shown in FIG. 2A, a set of light beams $L_{1a}$ to $L_{1e}$ split by the AOM1 have a beam center interval $2d$ in the subsidiary scanning direction and are arranged vertical to the main scanning direction.

Another set of light beams $L_{2a}$ to $L_{2e}$ split by the AOM2 are deviated by an interval a in the subsidiary scanning direction from the light beams $L_{1a}$ to $L_{1e}$ and arranged vertical to the main scanning direction. The aforementioned displacement a in the subsidiary scanning direction of the light beams $L_1$ and $L_2$ means this interval a. The displacement b in the main scanning direction means a deviation in position in the main scanning direction between the set of light beams $L_{1a}$ to $L_{1e}$ and the set of $L_{2a}$ to $L_{2e}$. The displacement in the main scanning direction can be provided by setting the optical system.

In the embodiment shown in FIG. 2B, the light beams $L_{1a}$ to $L_{1e}$ split from the light beam $L_1$ are adjacent to one another with a beam center interval d in the subsidiary scanning direction. The light beams $L_{2a}$ to $L_{2e}$ split from the light beam $L_2$ are also adjacent to one another with the same interval d in the subsidiary scanning direction. The set of light beams $L_{1a}$ to $L_{1e}$ and the set of $L_{2a}$ to $L_{2e}$ are positioned with an interval a in the subsidiary scanning direction and an interval b in the main scanning direction. The intervals a and b correspond to the aforementioned displacements a and b.

To detect the displacements a and b, only the AOM1 is first actuated to split the light beam $L_1$ into the light beams $L_{1a}$ to $L_{1e}$, and the beam position detector 52 detects and stores beam postions of the split light beams $L_{1a}$ to $L_{1e}$. Subsequently, only the AOM2 is driven to detect beam positions of the light beams $L_{2a}$ to $L_{2e}$. The beam positions are compared with the stored beam positions of the light beams $L_{1a}$ to $L_{1e}$. In this manner, the displacements a and b can be obtained. Further, by using one drive frequency for the AOMs 1 and 2, the light beams $L_1$ and $L_2$ are not split but deflected. Thus non-split but deflected two light beams have also a relative position the same as that between the light beam $L_{1a}$ and $L_{2a}$. Accordingly, the displacements a and b can be obtained.

From the displacement a obtained as aforementioned, data for compensating deflection angles of the AOM1 and the AOM2 is obtained and stored in a memory 62. The data is used for equalizing the displacement a with the beam interval d. Also from the displacement b, data for compensating a deviation in clock timing at which the light beams $L_1$ and $L_2$ draw an image is obtained and stored in the memory 62. The data for compensating the deviation in timing indicates a time difference corresponding to the displacement or interval b.

Numeral 64 denotes a clock generator. Based on the data for compensating the clock timing stored in the memory 62, the clock generator 64 supplies clock pulses $CL_1$ and $CL_2$ for driving the AOM1 and the AOM2 in synchronism with the synchronizing signal φ. The clock pulses $CL_1$ and $CL_2$ have a time difference for compensating the time difference of the displacement b.

Numeral 66 denotes an acousto-optic device control unit (AOM controller). Based on the data for compensating the deflection angles of the AOM1 and the AOM2 stored in the memory 62, the AOM controller 66 changes the frequencies of the ultrasonic drive signals for AOM1 and AOM2 to equalize the displacement a with the beam interval d. Also the AOM controller 66 selectively turns on/off respective superimposed frequencies in synchronism with the clock pulses $CL_1$ and $CL_2$ transmitted from the clock generator 64 and in response to a two-state (binary) image signal.

As a result, by selectively turning on/off plural light beams in accordance with the image signal and scanning, an image can be recorded at a high speed. Numeral 68 denotes a light source controller for driving the laser source 10.

When the split light beams $L_{1a}$ to $L_{1e}$ and $L_{2a}$ to $L_{2e}$ are arranged alternately in the subsidiary scanning direction as shown in FIG. 2A, the intervals among the light beams split by the AOM1 and the AOM2 are enlarged. Therefore, adjoining light beams can be prevented from interfering with each other. Also, when the sets of the light beams split by the AOM1 and the AOM2 are separated from each other in the subsidiary scanning direction as shown in FIG. 2B, deflection ranges of the AOM1 and the AOM2 are reduced and a drive frequency bandwidth is narrowed. Therefore, a usable AOM selection range is enlarged.

In the aforementioned embodiment, the light beam $L_0$ from one laser source 10 is split into two light beams by the beam splitter 12, and the split light beams $L_1$ and $L_2$ are led to the AOM1 and the AOM2, respectively. Alternatively, one light beam may be split into three or more and led to three or more AOMS. The respective light beams can be split by the AOMs and thereafter combined. By increasing the number of AOMs and the number of the light beams transmitted to the AOMs in this manner, an image output speed is further increased.

In the embodiment, the AOMs 1 and 2 split the light beam into five $L_{1a}$ to $L_{1e}$ and $L_{2a}$ to $L_{2e}$, respectively. The splitting number is not restricted. The light source can be plural laser diodes. In this case, the AOMs are separately provided with the laser diodes, respectively, and a laser beam emitted from each laser diode is separately transmitted to the corresponding AOM.

According to the present invention, the light beams split by the multi-frequency AOMS in the subsidiary scanning direction are respectively displaced so as not to overlap one another in the subsidiary scanning direction. Also, the sets of light beams split by the AOMs are deviated in the main scanning direction for scanning. Therefore, the split light beams do not interfere with one another. Also, without excessively enlarging the drive frequency band of the AOM, the number of scanning light beams can be largely increased. Therefore, the scanning speed is remarkably increased and the image can be recorded at a high speed.

In this case, when between the light beams split by the AOM the light beams split by another AOM intervene one by one, the light beams split by the AOM have an enlarged interval. The light beams can be effectively prevented from interfering with one another.

Also, the sets of light beams split by the AOMs can be adjacent to each other in the subsidiary scanning direction. With such arrangement, the drive frequency bandwidth of the AOM is not excessively large and the usable AOM selection range can be advantageously extended.

Further, the invention provides the light beam scanning device which is directly used for operating the method of the invention. By providing the light beam position detector, the displacements in the subsidiary and main scanning directions of the light beams split by the AOMs are obtained. From the detected displacements, the data for compensating the deflection of the AOM and for compensating the clock timing are obtained and stored in the memory. By using these data, control can be executed.

What is claimed is:

1. A control method of a light beam scanning device for scanning with a plurality of light beams which are split by using a multi-frequency acousto-optic device, which comprises the steps of:

splitting a first incident light beam into a first set of light beams with a first multi-frequency acousto-optic device in the subsidiary scanning direction, respective light beams in the first set not overlapping with each other;

splitting a second incident light beam into a second set of plural light beams with a second multi-frequency acousto-optic device in the subsidiary scanning direction, respective light beams in the second set not overlapping with each other;

scanning with both the first and second sets of light beams, while deviating said first set of light beams from said second set of light beams in a main scanning direction;

compensating a deviation in scanning phase between the first and second sets caused by the displacement in the main scanning direction with a clock timing of an image signal; and compensating a displacement in the subsidiary scanning direction between the first and second sets of light beams by changing frequencies of the driving signals for the first and second acousto-optic devices, respectively, so that adjacent light beams of the first and second sets of light beams have equal intervals in the subsidiary scanning direction.

2. The control method according to claim 1, wherein one light beam of said second set of light beams is positioned between adjacent light beams in said first set of light beams, in the subsidiary scanning direction.

3. The control method of claim 1, wherein said first set of light beams is positioned adjacent to said second set of light beams, in the subsidiary scanning direction.

4. A light beam scanning device for scanning with a plurality of light beams by using a multi-frequency acousto-optic device, which comprises:

a first multi-frequency acousto-optic device for splitting a first light beam into a first set of plural light beams in the subsidiary scanning direction;

a second multi-frequency acousto-optic device for splitting a second light beam into a second set of plural light beams in the subsidiary direction;

a controller for controlling said first and second acousto-optic devices in order that the light beams in the first and second sets do not overlap one another in the subsidiary scanning direction, respectively;

a scanning optical system for scanning by deviating said first set of light beams from said second set of light beam in a main scanning direction; and a clock generator for controlling a clock timing of an image signal in order to compensate a deviation between said first and second sets of light beams in the main scanning direction, wherein said controller compensates a displacement in the subsidiary scanning direction between the first and second sets of light beams by controlling frequencies of the driving signals for the first and second acousto-optic devices, respectively so that adjacent light beams of the first and second sets of light beams have equal interval in the subsidiary scanning direction.

5. The light beam scanning device according to claim 4, which further comprises:

a light beam position detector for detecting positions of the light beams split by said first and second acousto-optic devices;

a displacement detector for obtaining a displacement of the second set from the first set in the subsidiary scanning direction and a displacement in the main scanning direction, by referring the positions of the light beams detected by said light beam position detector; and a memory for storing a first data for compensating a deflection angle of the first and second acousto-optic devices, the first data being obtained from the displacement in the subsidiary scanning direction, and for storing a second data for compensating the clock timing obtained from the displacement in the main scanning direction; and wherein said controller uses the first data stored in said memory to compensate the deflection angle, and said clock generator uses the second data stored in said memory to compensate the clock timing.

6. The light beam scanning device according to claim 4, wherein one light beam of said second set of light beams is positioned between adjacent light beams in said first set of light beams, in the subsidiary scanning direction.

7. The light beam scanning device according to claim 4, wherein said first set of light beams is positioned adjacent to said second set of light beams, in the subsidiary scanning direction.

* * * * *

UNITED STATES PATENT AND TRADEMARK OFFICE
CERTIFICATE OF CORRECTION

PATENT NO. : 6,011,256
DATED : January 4, 2000
INVENTOR(S) : Norihisa TAKADA

It is certified that error appears in the above-identified patent and that said Letters Patent is hereby corrected as shown below:

Claim 1, column 5, line 65 delete "deviating" and insert therefor --maintaining deviation of --.
Claim 4, column 6, line 32, delete "by deviating" and insert therefor --while maintaining deviation of--; and
    column 6, line 34, delete "beam" and insert therefor --beams--.

Signed and Sealed this

Seventeenth Day of April, 2001

*Attest:*

NICHOLAS P. GODICI

*Attesting Officer*      *Acting Director of the United States Patent and Trademark Office*